Nov. 24, 1970  R. W. TRIPP  3,543,011
SINE-COSINE COMPUTER NETWORKS
Filed Feb. 12, 1968  4 Sheets-Sheet 1

INVENTOR.
Robert W. Tripp
BY Pennie, Edmonds,
Morton, Taylor and Adams
ATTORNEYS

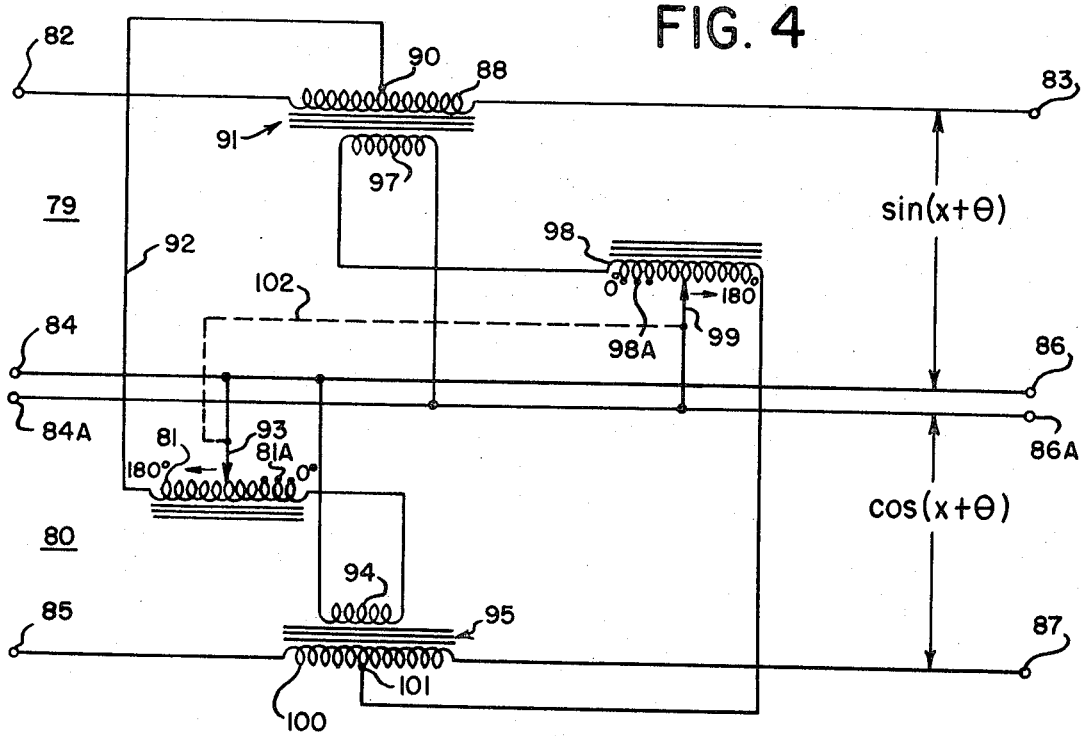

3,543,011
Patented Nov. 24, 1970

3,543,011
SINE-COSINE COMPUTER NETWORKS
Robert W. Tripp, New Rochelle, N.Y., assignor to Inductosyn Corporation, Carson City, Nev., a corporation of Nevada
Filed Feb. 12, 1968, Ser. No. 704,900
Int. Cl. G06g 7/22
U.S. Cl. 235—186                16 Claims

ABSTRACT OF THE DISCLOSURE

There are disclosed passive networks by means of which there may be produced, from voltages proportional to the sine and cosine of an angle, voltages proportional to the sine and cosine of the sum of that angle and another angle. These networks include separate channels for the sine and cosine voltages, cross-coupled by means of transformers having taps to effect multiplication by a factor proportional to the tangent of one-half the angle to be added, in accordance with the mathematical properties of the sines and cosines of the sums or differences of two angles.

BACKGROUND OF THE INVENTION

The invention relates to a sine-cosine computer network and is an improvement on the computing networks of the type shown in U.S. Pat. No. 2,849,668. In the patent, the tan computation networks do not, strictly speaking, give true sine and cosine outputs but contain a gain factor. The patent points out that Equations 3 and 4 are used for certain digits where the corresponding vector angle of the resolver is small. While exact in terms of null position, the gain factor proves disadvantageous in applications such as slow-down-and-stop machine control systems.

An object of the present invention is to provide a network which is not only exact, but constant in gain. This is important, since the position accuracy of an amplitude-sensitive servosystem depends upon the gain as well as the sine, cosine relationship.

A particular advantage of the computer networks of the present invention is that they can be used bilaterally, the input and output being interchangeable, and are equally suitable for addition or subtraction of angular values.

An object of the invention is to compute and supply signal values proportional to the sine and to the cosine of the sums or differences of angles which may be taken as $x$ and $\theta$.

SUMMARY OF THE INVENTION

In accordance with the invention, first and second channels are provided for receiving respective input signals whose amplitudes are proportional to the sine and cosine of an angle here designated as $x$. Means are provided in each channel for producing respective cross-coupling signals proportional to the sum of the input and output signals of the respective channel. Like proportions of the cross-coupling signal in each channel are inserted into the other channel to algebraically add to the input signal of that channel. The signs of the algebraic addition in the two channels are predetermined to yield respective output signals proportional to the sine and cosine functions of the algebraic sum of the input signal angle $x$ and an angle corresponding to the like proportions of the cross-coupling signals inserted in the channels. The latter angle is designated $\theta$ herein. In general the signs of algebraic addition are opposite in the two channels, and may be selected to give functions of the sum or difference of the angles $x$ and $\theta$.

As will be shown hereinafter, the angle $\theta$ in the output signal functions is related to the cross-coupling signals by the factor tan ($\theta/2$). By changing the like proportions of the cross-coupling signals inserted in the two channels in accordance with tan ($\theta/2$), the angle $\theta$ summed with the input angle $x$ may be changed.

In the specific embodiments described hereinafter, transformers are used for producing the cross-coupling, and taps thereon enable changing $\theta$ as desired. In some embodiments transformers having separate coils are employed, and in others autotransformers are employed. It will be understood that both types may be considered to have input and output coils, even though portions of the coils may be in common in the autotransformer arrangements.

In analyzing the circuits shown in the specific embodiments, several procedures are available. In one procedure inputs and outputs as shown may be initially assumed, the resulting opposed potentials in the cross-coupling circuits expressed trigonometrically, and the conclusion drawn that the initial assumptions were correct. In another procedure the outputs of the channels may be expressed as unknowns, the cross-coupling signals expressed trigonometrically, and equations solved simultaneously to obtain the output expressions. Both these procedures will be used hereinafter. In the second procedure the proportionality factors in the cross-couplings will be expressed in terms of tan ($\theta/2$), for convenience. However, if desired, arbitrary constants of proportionality could be used, and ultimately replaced by tan ($\theta/2$) to agree with the use of $\theta$ in the output signal expressions. This procedure is more complicated, and is believed unnecessary for explaining the invention.

It can be shown that the sine and cosine of an angle can be expressed in terms of the tangent of the half angle, as follows:

$$\text{Sin } \theta = \tan (\theta/2)[1+\cos \theta] \quad (1)$$
$$\text{Cos } \theta = 1 - \tan (\theta/2) \sin \quad (2)$$

It is known that:

$$\text{Sin } (x+\theta) = \sin x \cos \theta + \cos x \sin \theta \quad (3)$$

Substituting the values of sin $\theta$ and cos $\theta$ in Equations 1 and 2 for the terms in Equation 3 and simplifying, this becomes:

$$\text{Sin } (x+\theta) - \sin x = \tan (\theta/2)[\cos (x+\theta) + \cos x] \quad (4)$$

It is also known that:

$$\cos (x+\theta) = \cos x \cos \theta - \sin x \sin \theta \quad (5)$$

By substitution from Equations 1 and 2 and simplifying, this becomes:

$$\cos (x+\theta) - \cos x = -\tan (\theta/2)[\sin (x+\theta) + \sin x] \quad (6)$$

This invention utilizes the proportionality factor tan ($\theta/2$) as well as inputs sin $x$ and cos $x$, the sine channel having an output of sin $(x+\theta)$, the cosine channel having an output of cos $(x+\theta)$, with circuits interconnecting those channels, one of the circuits having therein, in opposition, potentials which are the electrical analog of the terms at the opposite sides of Equation 4, the other circuit having therein, in opposition, signal values which are the electrical analog of the terms at the opposite sides of Equation 6. The current flowing in each of those circuits satisfies Kirchoff's Law. Hence, it follows that with an input of sin $x$ in the sine channel and an input of cos $x$ in the cosine channel, the respective outputs will be sin $(x+\theta)$ and cos $(x+\theta)$, as has been established by actual tests.

Alternatively, Equations 4 and 6 may be derived and demonstrated mathematically as follows. The accompanying drawings illustrate some of the configurations applicable to the invention, with variations which are treated in more detail below. For the purpose of this mathematical demonstration, however, the drawings will be considered in two steps; step one deals with FIGS. 1 through 7 with the exception of FIG. 3, which is handled in step two. For FIGS. 1, 2, 4, 5, 6, and 7 then, let A represent the output of the channel corresponding to the sin $x$ input, let B represent the output of the channel corresponding to the cos $x$ input, and let tan $(\theta/2)$ represent the proportionality factor in the cross-coupling networks. Examination of the networks reveals that:

$$A = \sin x + \tan (\theta/2)[B + \cos x] \qquad (a)$$

and $$B = \cos x - \tan (\theta/2)[A + \sin x] \qquad (b)$$

Substituting for B in Equation (a) from Equation (b):

$$A = \sin x + \tan (\theta/2) \ 2 \cos x - \tan (\theta/2)[A + \sin x]$$
$$A = \sin x + 2 \tan (\theta/2) \cos x - A \tan^2 (\theta/2) - \tan^2 (\theta/2) \sin x$$

from which:

$$A[1 + \tan^2 (\theta/2)] = \sin x \ [1 - \tan^2 (\theta/2)] + 2 \tan (\theta/2) \cos x \qquad (c)$$

It can be shown, however, that:

$$1 + \tan^2 (\theta/2) = \frac{2}{1 + \cos \theta} \qquad (d)$$

$$1 - \tan^2 (\theta/2) = \frac{2 \cos \theta}{1 + \cos \theta} \qquad (e)$$

and $$\tan (\theta/2) = \frac{\sin \theta}{1 + \cos \theta} \qquad (f)$$

Substituting from Equations d, e and f in Equation c:

$$\frac{2A}{1 + \cos \theta} = \frac{2 \sin x \cos \theta}{1 + \cos \theta} + \frac{2 \cos x \sin \theta}{1 + \cos \theta}$$

$$\therefore A = \sin x \cos \theta + \cos x \sin \theta$$

from which, in the light of Equation 3:

$$A = \sin (x + \theta) \qquad (g)$$

Similarly, solving for B in Equation b by substituting therein for A from Equation a:

$$B = \cos x - \tan (\theta/2) \ 2 \sin x + \tan (\theta/2)[B + \cos x]$$
$$B = \cos x - 2 \tan (\theta/2) \sin x - B \tan^2 (\theta/2) - \tan^2 (\theta/2) \cos x$$

from which:

$$B[1 + \tan^2 (\theta/2)] = \cos x \ [1 - \tan^2 (\theta/2)] - 2 \tan (\theta/2) \sin x \qquad (h)$$

Substituting from Equations d, e and f in Equation h:

$$\frac{2B}{1 + \cos \theta} = \frac{2 \cos x \cos \theta}{1 + \cos \theta} - \frac{2 \sin x \sin \theta}{1 + \cos \theta}$$

$$\therefore B = \cos x \cos \theta - \sin x \sin \theta$$

from which, in the light of Equation 5:

$$B = \cos (x + \theta) \qquad (i)$$

Substituting the values of A and B from Equations g and i into Equations a and b:

$$\sin (x + \theta) = \sin x + \tan (\theta/2)[\cos (x + \theta) + \cos x]$$

or $$\sin (x + \theta) \sin x = \tan (\theta/2)[\cos (x + \theta) + \cos x]$$

which agrees with Equation 4
and $$\cos (x + \theta) = \cos x - \tan (\theta/2)[\sin (x + \theta) + \sin x]$$

or $$\cos (x + \theta) - \cos x = -\tan (\theta/2)[\sin (x + \theta) + \sin x]$$

which agrees with Equation 6.

Thus, Equations g and i demonstrate the performance of the networks shown, with the exception of FIG. 3, the analysis of which is as follows. Let A' and B' respectively represent the outputs in FIG. 3 corresponding to the outputs A and B in the other figures. Also, let C' represent the voltage between terminals 26 and 28, and let D' represent the voltage between terminals 27 and 29. Examination of the network, with proper polarity of windings observed, reveals that:

$$A' = \sin x + C' \qquad (a')$$

$$B' = \cos x - D' \qquad (b')$$

$$\frac{C'}{2} = \frac{B' + \cos x}{2 \tan (\theta/2)} \qquad (c')$$

$$\frac{D'}{2} = \frac{A' + \sin x}{2 \tan (\theta/2)} \qquad (d')$$

Let $\theta = 180° - \phi$, and note that:

$$\tan \frac{(180° - \phi)}{2} = \tan (90° - \phi/2) = \cot \phi/2 = \frac{1}{\tan \phi/2}$$

from which, by substituting in Equations c' and d' and simplifying:

$$C' = \tan (\phi/2)[B' + \cos x] \qquad (e')$$

and $$D' = \tan (\phi/2)[A' + \sin x] \qquad (f')$$

Substituting for C' and D' in Equations a' and b':

$$A' = \sin x + \tan (\phi/2)[B' + \cos x] \qquad (g')$$

and $$B' = \cos x - \tan (\phi/2)[A' + \sin x] \qquad (h')$$

It can be seen that Equations g' and h' are fundamentally the same as Equations a and b respectively for the other figures. The same mathematical argument employed for A and B of the other figures therefore applies to A' and B' here as well, yielding:

$$A' = \sin (x + \phi)$$

and $$B' = \cos (x + \phi)$$

But $\theta = 180° - \phi$, by definition $$\therefore \phi = 180° - \theta$$

Substituting for $\phi$ then $$A' = \sin (x + 180° - \theta)$$

or $$A' = -\sin (x - \theta) \qquad (i')$$

and $$B' = \cos (x + 180° - \theta)$$

or $$B' = -\cos (x - \theta) \qquad (j')$$

Although the solutions in Equations i' and j' are in terms of $\theta$ being a positive angle, it is possible to accommodate a negative angle $\theta$ by reversing the polarities of the tan $\theta/2$ taps.

It should be noted that the above mathematical treatment, in addition to demonstrating the fact that the networks produce values accurately corresponding to the sine and cosine of the sums of angles $x$ and $\theta$, also demonstrates that there is no gain change as $\theta$ takes on different values.

It should also be noted that it is possible to operate the networks of the invention in a reversible manner. Where going one way through the network would involve the addition of angles, going in the opposite direction would involve the subtraction of angles.

The drawings illustrate some of the preferred networks. Other possibilities exist, however, without departing from the spirit of the invention. The illustrations chosen, in addition to supporting the above analyses, also indicate some of the means offered by the invention to take advantage of practical manufacturing techniques insofar as the transformers are concerned. Different ranges of value for the angle $\theta$ will most efficiently be accommodated by one or more of the modifications shown.

For further details of the invention reference may be made to the drawings.

BRIEF DESCRIPTION OF THE DRAWINGS

FIG. 4 shows a network for values of $\theta$ from 0° to 180°.

FIG. 5 shows a preferred network for values of $\theta$ from 0° to 360°.

DESCRIPTION OF THE PREFERRED EMBODIMENTS

Figure 1:
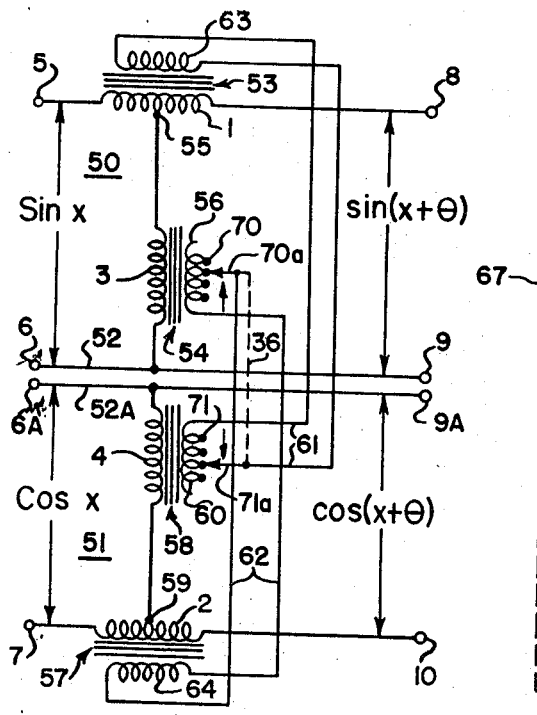
FIG. 1 shows a network ideally suited for values of $\tan \theta/2$ up to 1; that is, for values of $\theta$ up to 90°, although greater values may be used. This network employs a T connection for the circuits interconnecting the sine and cosine channels.
Figure 2:
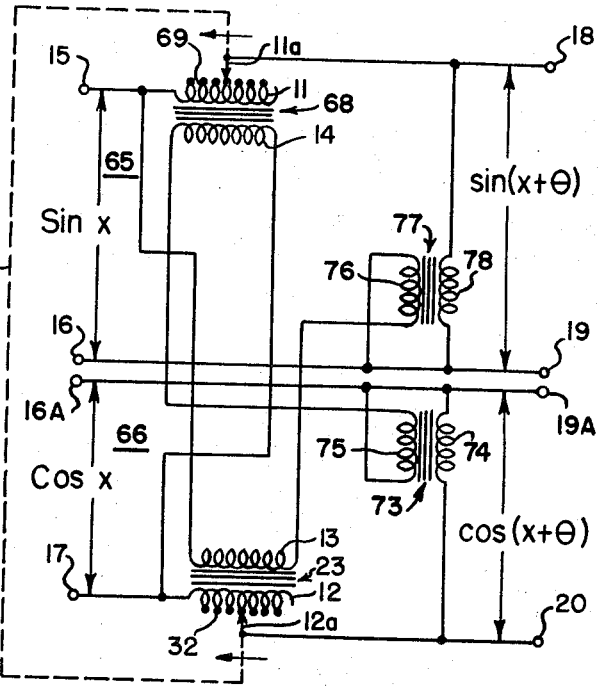
FIG. 2 shows a network similar to that of FIG. 1, but employing a $\pi$ connection instead of a T.

While the networks of FIGS. 1 and 2 are particularly well suited for values of $\theta$ ranging between 0° and 90°, they are not restricted to this range. The 0° to 90° range for $\theta$ is a matter of convenience and practicality in designing the transformers for these networks. Other transformer designs for a somewhat wider range are, however, possible. The same may be said with regard to the network of FIG. 3, where the best range for $\theta$ is from $-90°$ to $+90°$.

The network of FIG. 4 illustrates the use of autotransformers which are designed so that the ratio of the two sections is $\tan \theta/2$. In the network shown the ratio formed by the left-hand section of autotransformer 98, between the mark "0" and the tap, to the right-hand section, between the tap and the mark "180," provides the $\tan (\theta/2)$ relationship. The other autotransformer is similarly designed. It is thus practical to assign values to $\theta$ ranging from 0° to 180°.

The arrangement of FIG. 5 provides a means for handling both positive and negative values of $\tan (\theta/2)$. This is achieved by extending and modifying the arrangement of FIG. 4 so that the polarity of the $\tan (\theta/2)$ autotransformers is effectively reversed. Thus the $+\tan (\theta/2)$ terms accommodate angles ranging from 0° to 180°, and the $-\tan \theta/2$ terms accommodate angles ranging from 180° to 360°. This follows from the known relationship $$\tan (360°-\theta) = -\tan \theta$$

Figure 3:
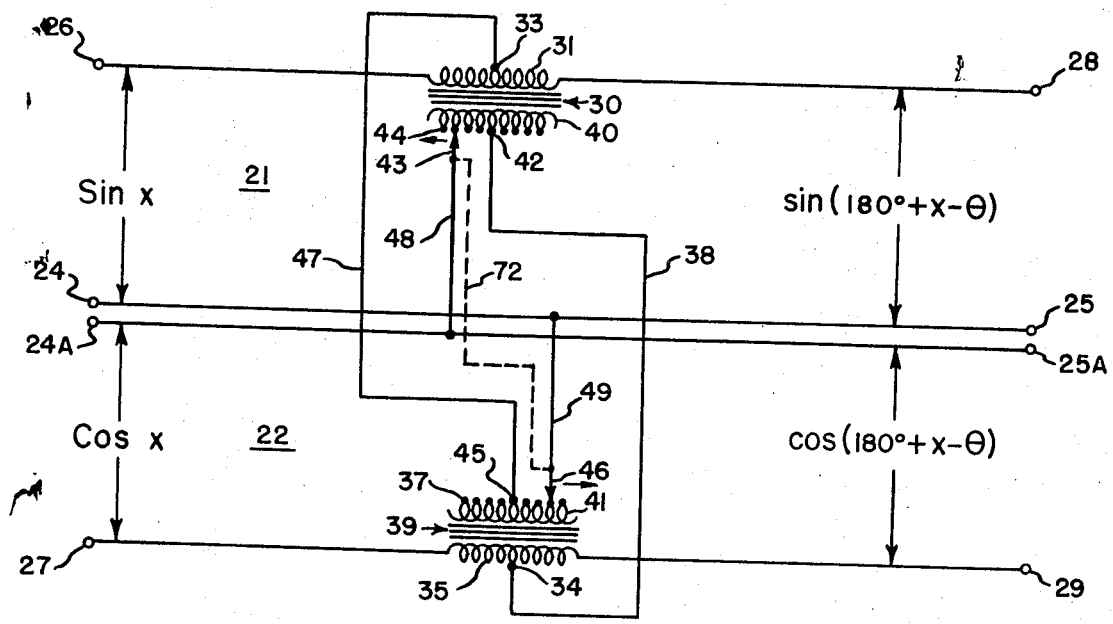
FIG. 3 shows a network which is preferred for values of $\theta$ from $-90°$ to $+90°$.
Figure 6:
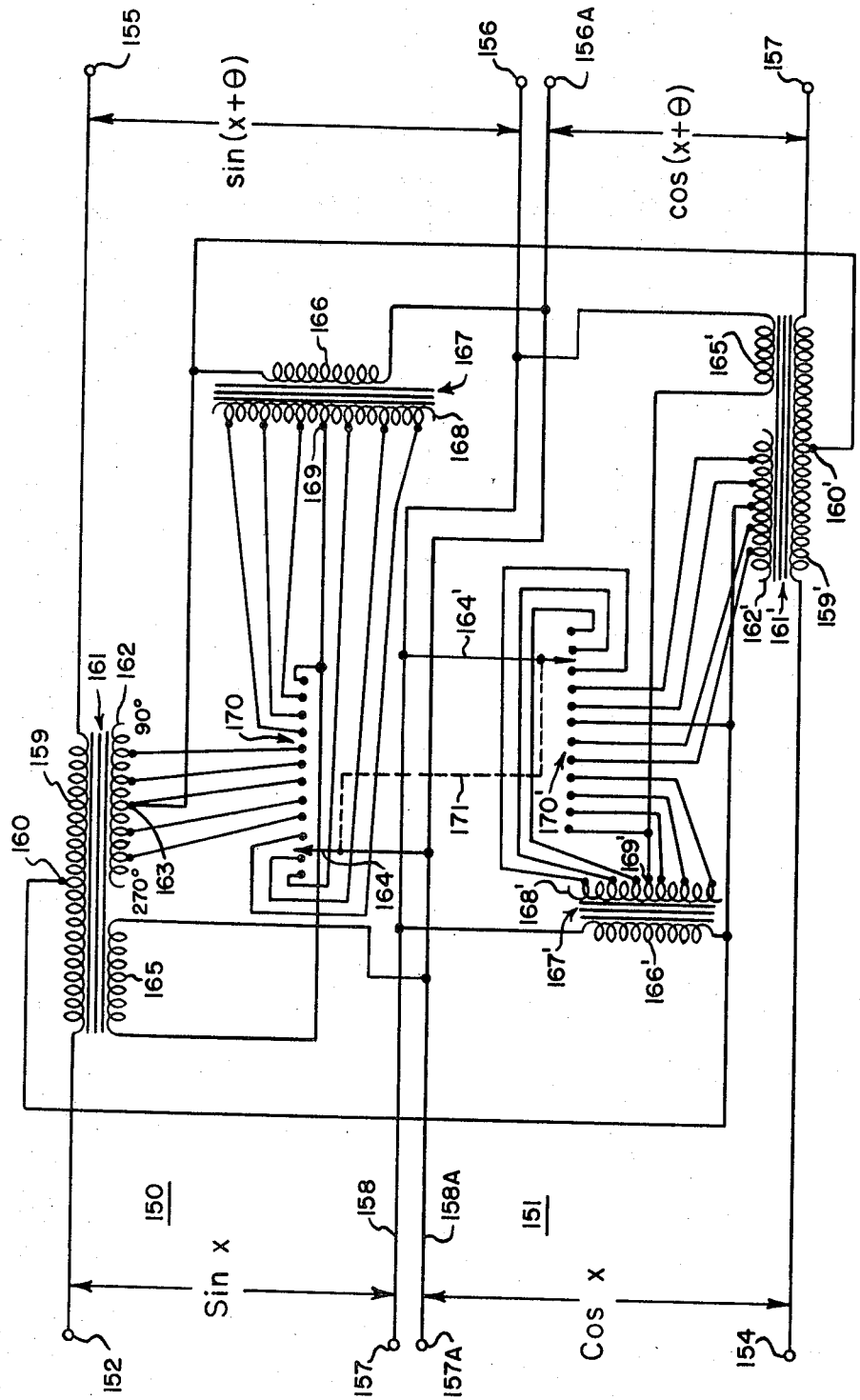
FIG. 6 shows another network which accommodates values of $\theta$ from 0° to 360°.

The network of FIG. 6 combines the features of FIGS. 1 and 3 in such a manner as to accommodate ranges of $\theta$ from 0° to 90°, 90° to 180°, 180° to 270° and 270° to 360° in appropriate steps.

Figure 7:
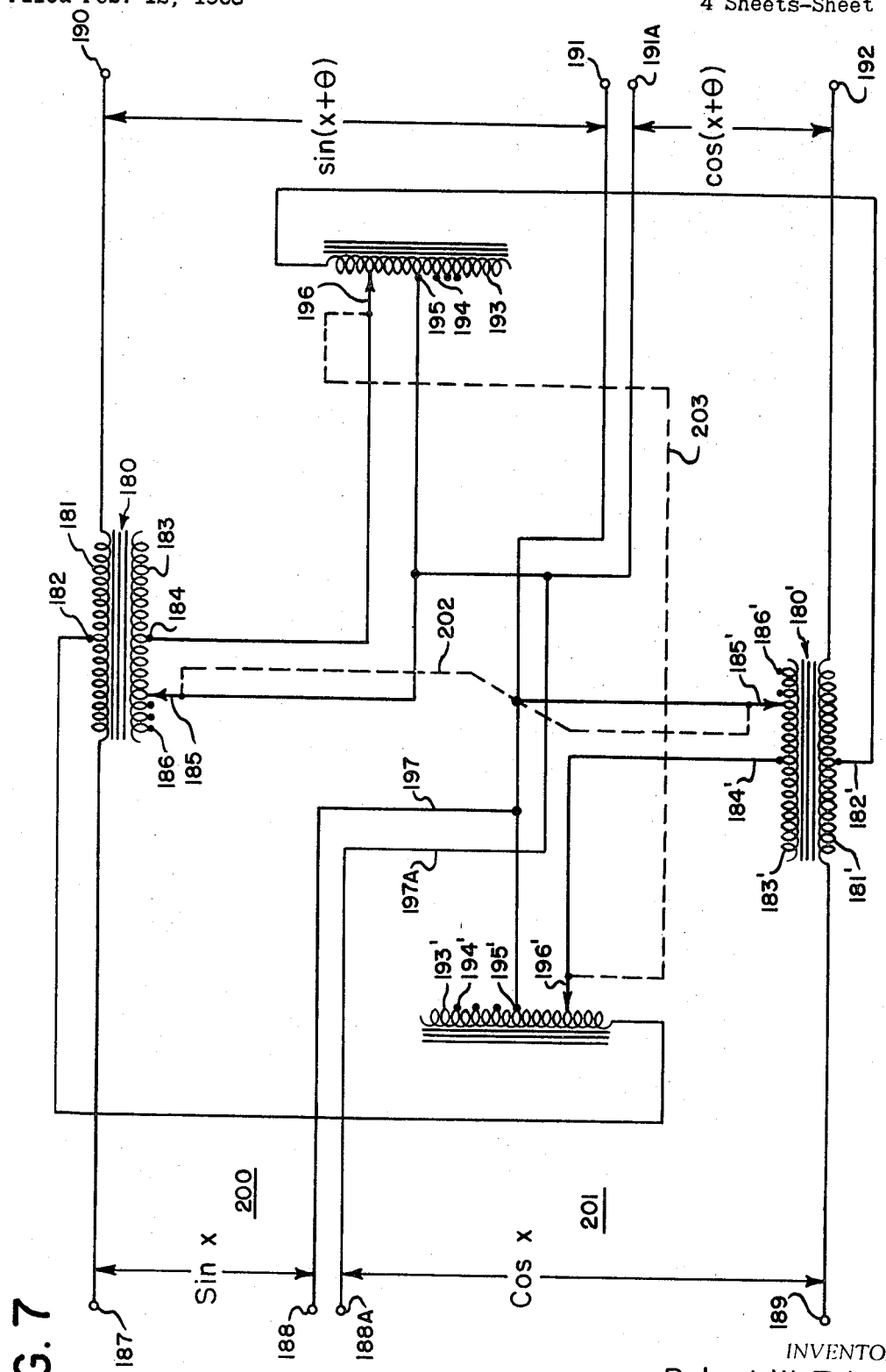
FIG. 7 shows another network which provides for values of $\theta$ from 0° to 360°.

The arrangement of FIG. 7 is basically that of a four-quadrant system similar to that of FIG. 6, but employing autotransformers instead of transformers to develop the $\tan (\theta/2)$ terms for the two quadrants from 0° to 90° and from 270° to 360°.

It is understood that the angle $x$ may have any desired value from 0° to 90° and that the electrical analogs of $\sin x$ and $\cos x$ may be derived from any suitable source, such as from taps on complementary sections of a transformer secondary winding.

Referring in detail to FIG. 1, a potential corresponding to $\sin x$ is applied between terminals 5 and 6 of the sine channel 50 and an output potential corresponding to $\sin (x+\theta)$ appears between terminals 8 and 9. A potential corresponding to $\cos x$ is applied between terminals 6A and 7 of cosine channel 51 and an output potential represented by $\cos (x+\theta)$ appears between terminals 9A and 10.

The potential across coil 1 of transformer 53 is $\sin (x+\theta) - \sin x$, this coil being connected between terminals 5 and 8. Coil 3 of transformer 54 is connected between midtap 55 of coil 1 and the conductor 52, and has applied across it a potential $(\frac{1}{2}) [\sin (x+\theta) + \sin x]$. Winding 56 of transformer 54 has taps 70 in terms of various values of $\tan (\theta/2)$.

Similarly, coil 2 of transformer 57 in cosine channel 51 is connected between terminals 7 and 10 and has across it a potential $\cos (x+\theta) - \cos x$. Coil 4 of transformer 58 is connected between midtap 59 of coil 2 and the conductor 52A, and has across it a potential $$(\frac{1}{2})[\cos (x+\theta) + \cos x]$$

Winding 60 of transformer 58 has taps 71 in terms of various values of $\tan (\theta/2)$.

The statement that coil 56 has taps 70 in terms of $\tan \theta/2$ means that if, as is advantageous, coil 63 has one half as many turns as coil 1, there is associated with each of the taps 70 a value $\tan (\theta/2)$ given by the ratio of the turns on coil 56 between the lower end thereof and that tap to the turns in coil 3. Similarly, if, as is advantageous, coil 64 has half as many turns as coil 2, each of the taps 71 of transformer 58 has a value $\tan (\theta/2)$ given by the ratio of the turns between that tap 71 and the upper end of coil 60 to the turns in coil 4. If the network of FIG. 1 is to handle values of $\theta$ up to 90°, the last tap on each of windings 56 and 60 thereof includes the same number of turns as on the corresponding one of windings 3 and 4, since $\tan 45° = 1$.

The sine and cosine channels 50 and 51 in FIG. 1 are connected by the two circuits 61 and 62. In circuit 61, a signal from the cross coupling transformer 58 equal to $$(\frac{1}{2}) \tan (\theta/2) [\cos (x+\theta) + \cos x]$$

is supplied to coil 63 of transformer 53 and, with the 1:2 turns ratio assumed, induces a signal in coil 1 which is twice that applied to coil 63. This is added to the input voltage $\sin x$ to give the output $\sin (x+\theta)$ in accordance with Equation 4. The signal from cross-coupling transformer 54 equal to $$(\frac{1}{2}) \tan (\theta/2) [\sin (x+\theta) + \sin x]$$

is supplied to coil 64 and induces twice the signal in coil 2 of transformer 57. The connections to coil 64 are reversed from those to coil 63. Thus the induced signal subtracts from $\cos x$ to give the output $\cos (x+\theta)$ in accordance with Equation 6.

The circuit of FIG. 1 may be analyzed from another point of view. Circuit 61 includes, in opposition:

(a) Coil 63 of transformer 53, that coil 63 having across it a potential proportional to the above-mentioned potential across coil 1, and (b) The portion of winding 60 selected by wiper 71a, this portion having across it a potential equal to the product of $\tan (\theta/2)$ and the above-mentioned potential across coil 4. As the opposing potentials in circuit 61 are equal, by Kirchoff's law, Equation 4 is satisfied.

Similarly, the circuit 62 has, in opposition:

(a) The coil 64 of transformer 57, and (b) The portion of winding 56 selected by wiper 70a, the former having a potential proportional to that of coil 2 and the latter having a potential proportional to the product of $\tan (\theta/2)$ and $\sin (x+\theta) + \sin x$. As such potentials in circuit 62 are equal and opposite, by Kirchoff's law, Equation 6 is satisfied.

The minus sign immediately to the right of the equal sign in Equation 6 is taken into account by properly connecting the terminals of coil 64. It will be observed that terminals 6 and 9 are short-circuited together and that terminals 6A and 9A are short-circuited together.

In FIG. 2, the input sin $x$ to the sine channel 65 is applied between terminals 15 and 16. The input cos $x$ is applied to the cosine channel 66 between terminals 16A and 17. The output sin $(x+\theta)$ is taken from terminals 18 and 19, and the output cos $(x+\theta)$ from terminals 19A and 20. Terminals 16 and 19 are short-circuited, as are terminals 16A and 19A.

The potential across that part of coil 11 of transformer 68 which is in circuit, i.e. between terminal 15 and the wiper 11a thereon, is sin $(x+\theta)$ −sin $x$. Coil 11 has taps 69 in terms of tan $(\theta/2)$.

Coil 14 of transformer 68 is connected from terminal 17 and through winding 75 of transformer 73 to terminal 16A to thereby pick up the value cos $x$ to which is added the value cos $(x+\theta)$ from the output winding 75 of transformer 73 having a primary winding 74 connected across the terminals 19A and 20.

Coil 12 of transformer 23 has across it, i.e. between terminal 17 and the wiper 12a on winding 12, a potential cos $(x+\theta)$ −cos $x$. Coil 12 has taps 32 in terms of tan $(\theta/2)$. Coil 13 is connected from terminal 15 through winding 76 of transformer 77 to terminal 16 to pick off the potential sin $x$ which is added to the value sin $(x+\theta)$ by the secondary winding 76 of transformer 77 having a primary winding 78 across terminals 18 and 19. The statement that coil 11 has taps 69 in terms of tan $(\theta/2)$ means that each of these taps has associated therewith a value tan $(\theta/2)$ given by the ratio of the turns in coil 11 between terminal 15 and wiper 11a to the turns in coil 14. The quantity tan $(\theta/2)$ is similarly defined for the various taps 32 of coil 2 as the ratio of the turns in coil 12 between terminal 17 and wiper 12a to the turns in coil 13.

The potential across terminals 15 and 18, i.e. from terminal 15 to wiper 11a, namely sin $(x+\theta)$ −sin $x$, is equal to the potential induced therein from coil 14, namely tan $(\theta/2)$ [cos $(x+\theta)$ +cos $x$], in accord with Equation 4.

The potential across terminals 17 and 20, i.e. from terminal 17 to wiper 12A, namely cos $(x+\theta)$ −cos $x$, is equal to the potential induced therein by coil 13, namely $$-\tan (\theta/2)[\sin (x+\theta)+\sin x]$$

in accord with Equation 6. The minus sign is dealt with by properly connecting the terminals of coil 13 in circuit with the terminals 15 and 16.

From the other point of view, a signal proportional to the sum of the input and output signals in the sine channel is produced by transformer 77 via connections of coil 76 thereof between terminals 16 and 15. This signal is supplied to coil 13 in the cosine channel and induces a signal in the portion of coil 12 between 17 and wiper 12a in a proportion determined by the wiper setting, here denoted tan $(\theta/2)$, complying with Equation 6. In like manner, transformer 73, coil 14, and wiper 11a induce in the sine channel a signal proportional to the sum of the input and output signals of the cosine channel. The proportion is the same as in the cosine channel, denoted tan $(\theta/2)$ complying with Equation 4.

The following analysis can be made for FIG. 3.

Rewrite the basic Equations 4 and 6 in terms of $\phi$, as follows:

sin $(x+\phi)$ −sin $x$=tan $(\phi/2)$[cos $(x+\phi)$ +cos $x$]  (7)
cos $(x+\phi)$ −cos $x$=tan $(\phi/2)$[sin $(x+\phi)$ +sin $x$]  (8)

Let $\phi=180°-\theta$ (axis re-orientation)

Then Equations 7 and 8 respectively become sin $(x+180°-\theta)$ −sin $x$
 =tan $(90°-\theta/2)$[cos $(x+180°-\theta)$ +cos $x$]  (9)

cos $(x+180°-\theta)$ −cos $x$
 =−tan $(90°-\theta/2)$[sin $(x+180°-\theta)$ +sin $x$]  (10)

tan $(90°-\theta/2)$=cos $\theta/2$=1/tan $(\theta/2)$

Simplifying Equations 9 and 10 we obtain respectively, sin $(x+180°-\theta)$ −sin $x$
 =[1/tan $(\theta/2)$][cos $(x+180°-\theta)$ +cos $x$]  (11)

or

[sin $(x+180°-\theta)$ −sin $x$]tan $(\theta/2)$
 =cos $(x+180°-\theta)$ +cos $x$  (12)

cos $(x+180°-\theta)$ −cos $x$
 =[−1/tan $(\theta/2)$][sin $(x+180°-\theta)$ +sin $x$]  (13)

or

[cos $(x+180°-\theta)$ −cos $x$]tan $(\theta/2)$
 =−[sin $(x+180°-\theta+$sin $x$]  (14)

In FIG. 3, a potential corresponding to sin $x$ is applied between terminals 24 and 26 of sine channel 21 and an output potential corresponding to sin $(180°+x-\theta)$ or −sin $(x-\theta)$ appears between terminals 25 and 28. A potential corresponding to cos $x$ is applied between terminals 24a and 27 of cosine channel 22 and an output potential represented by cos $(180°+x-\theta)$ or −cos $(x-\theta)$ appears between terminals 25A and 29. Terminals 24 and 25 are short circuited, as are terminals 24A and 25A.

The potential across coil 31 of transformer 30 is sin $(180°+x-\theta)$ −sin $x$. Coil 31 is connected between terminals 26 and 28.

Coil 40 of transformer 30 has taps indicated at 44, in terms of tan $(\theta/2)$ and the wiper 43 can be set to such taps at either side of the midtap 42.

Coil 41 of transformer 39 has taps 37 in terms of tan $(\theta/2)$ and the wiper 46 can be set to such taps on either side of the midtap 45. The midtaps 33 of coil 31 and 45 of coil 41 are connected together by conductor 47, and the midtaps 42 of coil 40 and 34 of coil 35 are connected together by conductor 38. The wiper 43 is connected to the terminal 24A of channel 22 by conductor 48 and the wiper 46 is connected by conductor 49 to terminal 24 of channel 21. The quantity tan $\theta/2$ is defined for each of the taps 44 of coil 40 as the ratio of the turns between that tap and the center tap 42 to one half the turns in coil 31, and the quantity tan $\theta/2$ is similarly defined for each of the taps 37 of coil 41 as the ratio of the turns between that tap and the center tap 45 to one half the turns in coil 35.

The electrical analog of Equation 12 is found in FIG. 3 as follows. The potential between conductor 48, midtap 42 and conductor 38 corresponding to that across coil 31 is (½)tan $(\theta/2$[sin $(180°+x-\theta)$ −sin $x$]

which is the same as the potential in the remainder of the circuit, namely between conductors 38 and 48 via and center tap 34, i.e. one-half of cos $(180°+x-\theta)$ +cos $x$ The electrical analog of Equation 14 is supported by FIG. 3 as follows: The potential between conductor 47 and conductor 49 via taps 37 of coil 41 is (½)tan $(\theta/2)$[cos $(x+180°-\theta)$ −cos $x$]

which is the same as the potential between conductors 47 and 49 via midtap 33, namely one-half of sin $(x+180°-\theta)$ +sin $x$ In FIG. 3, the terminals 24 and 25 are short circuited together, as are the terminals 24A and 25A.

From the other point of view, the signal between wiper 43 and center tap 42 in the sine channel is proportional to the sum of the input and output signals in the cosine channel, and induces a signal in coil 31 in a proportion determined by the wiper setting. Corresponding relationships obtain for the cosine channel. The detailed trigonometric relationships need not be restated.

In FIG. 4, the input sin $x$ to the sine channel 79 is applied between terminals 82 and 84 and the input cos $x$ to the cosine channel 80 is applied between terminals 84A and 85. The output sin $(x+\theta)$ is available between terminals 83 and 86, and the output cos $(x+\theta)$ is available between terminals 86A and 87. The potential across coil 88 is sin $(x+\theta)$ −sin $x$. That portion of coil 81 between center tap 90 and wiper 93, which wiper is in terms of tan $(\theta/2)$, has, via midtap 90 of transformer 91 and via conductor 92 and the wiper 93 on coil 81, a potential of one-half the sum of the input and output signals in the sine channel. With tan $(\theta/2)$ as defined below, a resultant signal of $$\tan (\theta/2)[½][\sin (x+\theta)+\sin x]$$

is produced. The negative of this resultant signal is equated with one-half of cos $(x+\theta)$ −cos $x$ via coil 94 of transformer 95, in accordance with Equation 6 above. In similar manner, coil 97 and coil 98 serve to equate one-half of sin $(x+\theta)$ −sin $x$ with one-half of $$\tan (\theta/2)[\cos (x+\theta)+\cos x]$$

in accordance with Equation 4.

In FIG. 4, terminals 84 and 86 are short circuited, as are terminals 84A and 86A.

Coils 98 and 81 have taps 98A and 81A with which are associated values tan $(\theta/2)$. For coil 98 these are defined as the ratio of the turns between the left-hand end of coil 98 and the wiper 99 to the turns between wiper 99 and the right-hand end of coil 98. For coil 81 these values are defined as the ratio of the turns between the right-hand end of coil 81 and wiper 93 to the turns between wiper 98 and the left-hand end of coil 81.

The analysis of FIG. 4 in terms of cross-coupling signals induced in each channel from the other is similar to that given for FIG. 1, since the circuit configurations are similar. The use of autotransformers 81, 98 in the cross-coupling circuits of FIG. 4 instead of the separate winding transformers 54, 58 of FIG. 1 allows a greater range of adjustment since in an autotransformer the ratio of transformation can approach very high values as the wiper approaches the input end of the transformer.

Thus the invention provides a network with the aid of which there may be obtained alternating current (A.C.) voltages proportional to the sine and to the cosine of the sum of two angles. Let the angles be called $x$ and $\theta$. Voltages propotrional to the sine and to the cosine of one of the angles, say $x$, and which may be generated by conventional means of the prior art—for example in the secondary windings of a resolver having one primary winding and two secondary windings in space quadrature—are applied to the network of the invention, at the sine and cosine channels thereof as hereinabove described. The network includes variable ratio transformers by means of which the value of the second angle $\theta$ may be set in, so as to obtain at the output of the network voltages proportional to sin $(x+\theta)$ and cos $(x+\theta)$.

Returning again to FIG. 1 there is shown a sine channel 50 having input terminals 5 and 6 and output terminals 8 and 9, and a cosine channel having input terminals 6A and 7 and output terminals 9A and 10. In the operation of the apparatus, there is applied between terminals 5 and 6, from a source not shown, an A.C. voltage which may be for example of 10 kc. frequency, and of amplitude proportional to the sine of an angle $x$ of value between 0 and 90°.

A cophasal voltage of the same frequency and of amplitude proportional to the cosine of the same angle $x$ is applied across the terminals 6A and 7.

The constant of proportionality is the same for both applied voltages, i.e. a fixed voltage amplitude, representative in channel 50 of the sine of 90° and in channel 51 of the cosine of 0°.

The signal source may for example be the two space quadrature secondary windings of a resolver, wherein the angle $x$ is inserted by appropriate angular positioning of the primary member with respect to the secondary member. Such a source is convenient if the sine and cosine channels are to be isolated from each other by the use of separate, isolated "ground side" conductors as shown for example at 52 and 52A in FIG. 1. If instead the conductors 52 and 52A constitute a common conductor, the cophasal A.C. voltages proportional to sin $x$ and cos $x$ may conveniently be derived from a source such as the tapped secondary winding of the transformer 61 in FIG. 1 of Pat. No. 2,849,668.

The taps 70 and 71 on coils 56 and 60 may have any desired spacing according to the values of the angle $\theta$ which it is desired to be able to include in the functions sin $(x+\theta)$ and cos $(x+\theta)$ of which the network is to generate representative voltages. Indeed, the tapping may be continuous, with the wipers 70a and 71a making contact successively with all of the turns of the coils 56 and 60.

In order for the network to operate correctly, the two channels 50 and 51 should preferably be matched, so that the conductors 52 and 52A may be regarded as defining a mirror plane, perpendicular to the plane of the figure. Every circuit element above that mirror plane will then have a counterpart of the same electrical value below that mirror plane. While the invention can successfully be practiced without adherence to this criterion, the scope of the invention being set forth in the appended claims, it is advantageous to match the sine and cosine channels as just stated, not only in the embodiment of FIG. 1 but in those of the other figures as well.

In particular, the values of $\theta$ set in by adjustment of the wipers 70a and 71a should be the same in both channels, if output voltages sin $(x+\theta)$ and cos $(x+\theta)$ are to be obtained. Advantageously therefore the wipers 70a and 71a are mechanically coupled together by a linkage, diagrammatically indicated as the dash line 36, so as to move in step from the $\theta=0$ end of their ranges to the end of their ranges for which $\theta$ is a maximum. That is, taps 70a and 71a will move in opposite directions as shown in the diagram of FIG. 1.

The embodiment of FIG. 2 is similar in its capabilities to that of FIG. 1. Thus it can readily handle $\theta$ values between 0° and 90°, if coils 11 and 14, and 12 and 13 have the same number of turns. Preferably, all four coils will have the same number of turns, although the embodiment of FIG. 2 can be extended to values of $\theta$ beyond 90° by giving to coils 11 and 12 a number of turns suitably larger than that of coils 14 and 13. For $\theta=0°$, the sliders 11a and 12a are at the left end of their travel in the figure. The sliders are advantageously coupled together as indicated at 67.

Referring again to FIG. 3, this is a network according to the invention well adapted to generating the sine and cosine of the difference of two angles. As above set forth, the output voltages of its sine and cosine channels 21 and 22 are sin $(180°+x−\theta)$ and cos $(180°+x−\theta)$ respectively, and these are by trigonometric identity equal respectively to −sin $(x−\theta)$ and −cos $(x−\theta)$. The minus signs preceding these functions are materialized in the 180° phase relation between these output voltages and the reference from which the input voltages are generated—e.g. the unit amplitude input voltage to channel 21 when $x=90°$, and may be suppressed in practical effect by an interchange of leads between each of these channels and the following load device.

In FIG. 3, the sliders, wipers or swingers 43 and 46 are advantageously coupled together by a linkage 72 as in the other embodiments. Excursions in one direction away from the midtaps 42 and 45 on their respective coils represent positive values of $\theta$ while those in the opposite direction represent negative values of $\theta$. Of course the two sliders must be on taps (i.e. at positions on their coils) for which $\theta$ has not only the same numerical value but also the same sign.

Referring further to FIG. 4, with the channels 79 and 80 fed with voltages proportional to sin $x$ and cos $x$ respectively, as explained in detail in connection with FIG. 1, the voltages across the portions of coils 81 and 98 from their sliders to center taps 90 and 101 will be $$[\tfrac{1}{2}] [\sin (x+\theta) + \sin x]$$

and $$[\tfrac{1}{2}] [\cos (x+\theta) + \cos x]$$

respectively. The coils are marked in the drawings "180°" at the ends thereof adjacent the midpoints 90 and 101 of coils 88 and 100 respectively, and they are marked 0° at their opposite ends.

A linkage is shown at 102, coupling the sliders 93 and 99 together so as to be together on their 180° ends and together on their 0° ends.

FIG. 5 illustrates an embodiment in which there may be directly inserted values of $\theta$ between 0° and 360°, i.e. with (if desired) a continuous range of $\theta$-values extending from 0° to 360°. In this embodiment the coil 111 of a transformer 110 is connected between the non-grounded input and output terminals 126 and 129 of one channel 123, and the other channel 124 contains a corresponding coil 116 of a transformer 117. The ends of the second winding 112 of transformer 110 connect through coils 114 and 115 to the midtap 132 on coil 116. Similarly, the ends of the second coil 118 on transformer 117 connect through coils 119 and 120 to the midtap 133 on winding 111. A slider or wiper 121 successively engageable with coils 114 and 115 connects to the ground-side conductor 125A of channel 124, and a slider 122 successively engageable with coils 120 and 119 connects to the ground-side conductor 125 of channel 123. The sliders 121 and 122 are advantageously coupled together as indicated at 134 and the coils in each of the pairs 115, 114 and 119, 120 are so disposed that when the slider 121 reaches the 0° limit of coil 115 it passes onto the 360° limit of coil 114, and similarly for the slider 122 in its engagement with coils 119 and 120. The dot and dash line slider showings at 121a and 122a are intended to illustrate this construction in the drawing.

With voltages sin $x$ and cos $x$ applied to channels 123 and 124 and with the sliders 121 and 122 set to corresponding (i.e. equal $\theta$-valued) positions, the output voltages from channels 123 and 124 will be sin $(x+\theta)$ and cos $(x+\theta)$. The angle $\theta$ is identified as follows: If wiper 121 engages coil 115 (or taps thereon) and if wiper 122 engages coil 119, $\theta$ is twice the arc-tangent of the ratio of the turns on coil 115 between the left end of the coil and slider 121 to the turns between that slider and the right end of coil 115. Due to operation of the linkage 134, this will be the same as the ratio of the turns between the right end of coil 119 and wiper 122 to the turns between wiper 122 and the left end of coil 119. If wipers 121 and 122 instead engage coils 114 and 120, $\theta$ is twice the arc-tangent of the ratio of the turns between the right end of coil 114 and slider 121 to the turns between slider 121 and the left end of coil 114. This ratio is the same as the ratio of the turns between the left end of coil 120 and slider 122 to the turns between slider 122 and the right end of coil 120.

FIG. 6 illustrates another network according to the invention on which settings of the angle $\theta$ to be added to the argument can be directly made for values of that angle between 0° and 360°.

In FIG. 6 the coil 159 of a transformer 161 is connected between the terminals 152 and 155 of the ungrounded side of the sine channel 150. Two windings 162 and 165 are inductively coupled to winding 159. Winding 162 has a center tap at 163 connected to the center tap 160' of the winding 159' of transformer 161' in the cosine channel 151. The connection of winding 162 in FIG. 6 is thus similar to that of winding 40 in FIG. 3. The winding 165 and the whole of the winding 162 each have advantageously half as many turns as the complete winding 159. The winding 162 is tapped at a number of points, on either side of and including its center tap 163, and these points are connected to taps in a series of taps 170 engageable by a slider or wiper 164 returned to the ground side conductor 158A of the cosine channel. The points in the winding 162 so tapped are selected, in a manner presently to be described, in terms of values for the angle $\theta$ between 90° and 270° which it is desired to be able to handle.

The cosine channel 151 contains a transformer 161' located in the same position in that channel as is occupied in channel 150 by the transformer 161, and preferably matching it in electrical characteristics. Elements of structure in the cosine channel corresponding to elements in the sine channel bear the same reference characters, with primes thereon.

The sine channel 150 includes a second transformer 167 having one coil 166 connected between center tap 160' of the winding 159' on transformer 161' and the impedance-free or ground side conductor 158A of channel 151. Transformer 167 includes a second coil 168 inductively coupled to coil 166. Coil 168 has a center tap 169 connected to one end of coil 165, and is tapped at a number of points on either side of that center tap, the center tap and these points being brought out to taps in the array 170. Except for the fact that 169 is a center tap rather than an end tap, transformer 167 will be seen to correspond to the transformer 58 of FIG. 1, winding 165 of FIG. 6 corresponding to winding 63 of FIG. 1.

Advantageously the coil 166 contains as many turns as the complete coil 168.

Channel 151 includes the transformer 161' already mentioned, and a transformer 167' corresponding to and preferably matching transformer 167 in channel 150. An array of taps 170' is provided in channel 151, connected to points in the windings 162' and 168' in the same way as has been described in conjunction with windings 162 and 168. A slider or wiper 164' which scans these taps is returned to the impedance-free or ground side conductor 158 of the sine channel 150. The sliders 164 and 164' are coupled together by means of a linkage 171 so that the two wipers move in opposite directions in the figure, across their respective sets of taps.

The taps on the coils 168 and 168' provide for values of $\theta$ in the range 270° $<\theta<$90°, i.e. for values of $\theta$ between 270° and 360°, and between 360° (or 0°) and 90°. Thus on, say, the upper half of coil 168 and on the lower half of coil 168', the taps have $\theta$ values given by twice the arc-tangent of the ratio of the turns on coil 168 between center tap 169 and the selected tap 170 to one half the turns of coil 166. When this turns ratio is unity, the arc-tangent is 45° and the $\theta$ value is 90°, and transformers 167 and 167' may conveniently be constructed to handle $\theta$ values up to 90°. The other halves of the transformers 168 and 168' handle negative values of $\theta$ from 0° to 90°, i.e., positive $\theta$ values between 270° and 360°.

When the sliders 164 and 164' engage taps leading to, say, the upper half of coil 168 and the lower half of coil 168', the network of FIG. 6 is essentially the same as that of FIG. 1, the windings 162 and 162' being without effect. FIG. 1 could also be constructed to handle negative values of $\theta$ by providing a second half to the windings 56 and 60 thereof, and by extending the windings 3 and 4 so that each half of the center tapped windings 56 and 60 so provided was inductively coupled with a separate half of the winding 3 or 4 of equal number of turns to itself.

When in FIG. 6, $\theta$ values between 90° and 180° are to be inserted, the sliders 164 and 164' are shifted to taps on, say, the right half of winding 162 and the left half of winding 162'. When $\theta$ values between 180° and 270° are to be inserted, those sliders are shifted to taps on the left half of winding 162 and the right half of winding 162'. For the taps 170 and 170' connected to coils 162 and 162', there may be defined an angle $\theta'$ which is twice the angle whose tangent is given by the ratio of the turns between center tap 163 and the selected tap 170 to one half the total turns of coil 159, and by the corresponding ratio of turns in transformer 161'. Then for, say, the right half of winding 162 and the left half of winding 162', $\theta'=180°-\theta$ whereas for the left half of winding 162 and the right half of winding 162', $\theta'=180°+\theta$.

FIG. 7 illustrates another embodiment of the invention capable of handling directly all values of $\theta$ between 0° and 360°. In FIG. 7 a transformer 180 has a coil 181 connected between terminals 187 and 190, constituting the "high" input and output terminals of a sine channel 200. The midtap 182 of coil 181 connects to one end of a coil 193', in the cosine channel 201. The center tap 195' of coil 193' connects to the lower side conductor 197 of the sine channel, and a slider or wiper 196' on coil 193' connects to the midtap 184' on the coil 183' of a transformer 180' which is positioned in the cosine channel in the same fashion as and which matches transformer 180 in channel 200.

The center tap 184 on coil 183 connects to wiper 196 on a coil 193 positioned in the sine channel in the same position as and matching coil 193' in the cosine channel. Slider 185 on coil 183 connects to the low side conductor 197A of cosine channel 201, as does the center tap 195 on coil 193. Coils 183 and 193 have taps 186 and 194 thereon respectively, and coils 183' and 193' have taps 186' and 194' thereon respectively, positioned in terms of tan $\theta/2$ for the insertion of desired $\theta$-values. If, as has been assumed, the network of FIG. 7 is to cover $\theta$-values from 0° to 360°, coils 181 and 183 have the same number of turns, as do coils 181' and 183'. Taps are provided at the desired intervals in $\theta$-values, the extreme taps at the ends of coil 183 having between each such extreme tap and the center tap 184 half the number of turns in the complete coil 181. The value of the angle set up on the transformers 180 and 180' is thus related to the numbers of turns on the windings of those transformers and to the location of the taps 186 and 186' in essentially the same way as that hereinabove described with respect to transformers 30 and 39 of FIG. 3.

The taps 194 and 194' on coils 193 and 193' provide for entry of $\theta$ values in the range of 0° to 90° (or, optionally, from 0° to —90°). For values of $\theta$ in these ranges, the wipers 185 and 185' are positioned at an extreme tap on their coils 183 and 183', whereat the ratio of the turns between slider 185 and the center tap 184 to one half the turns of coil 181 is unity. Let it be assumed that with sliders 185 and 185' at their left and right extreme taps respectively, the polarities are such that advance of sliders 196 and 196' upwards and downwards respectively from their center taps 195 and 195' give output voltages sin $(x+\theta)$ and cos $(x+\theta)$ corresponding to positive values of $\theta$. For $\theta$ values between 0° and 90°, the value of $\theta$ set in on wipers 196 and 196' is then defined as twice the arc-tangent of the ratio of the turns in coil 193 between the midtap 195 and the slider 196 to the number of turns in that coil between that midtap and the midtap 182' of coil 181'. To set in values of $\theta$ between 90° and 180°, sliders 196 and 196' are then left at their upper and lower extreme positions respectively, and sliders 185 and 185' are traversed together from left to right and from right to left respectively. The 180° value for $\theta$ is reached when sliders 185 and 185' are on their midtaps 184 and 184'. For the range of $\theta$ between 90° and 180° we may define for the transformers 180 and 180' an angle $\theta'=180-\theta$ in which $\theta'$ is twice the arc-tangent of the ratio of turns between slider 185 and midtap 184 to one half the total turns of coil 181. For the range of $\theta$-values between 180° and 270° we may define an angle $\theta''=\theta+180°$ in which $\theta''$ is twice the arc-tangent of the ratio of turns between midtap 184 and the slider 185 to one half the total turns of winding 181.

For values of $\theta$ between 270° and 360° the sliders 185 and 185' are left in the extreme positions thereof for $\theta=270°$ and the sliders 196 and 196' are returned toward their center taps 195 and 195'.

With this construction, the sense of excursion of the sliders 196 and 196' from their center taps, for values of $\theta$ between 0° and 90° depends on whether the sliders 185 and 185' are in one or the other of their extreme positions. This can be avoided by the provision of a mechanism coupling the linkages 202 and 203 so that when the sliders 196 and 196' return to their center taps, sliders 185 and 185' are switched from their right and left extreme positions to their left and right extreme positions, respectively. Such a mechanism would make superfluous the lower halves of the coils 193 and 193'.

While the invention has been described hereinabove in terms of a number of presently preferred exemplary embodiments, it is not limited thereto. To take one example, the two channels may in all of the embodiments disclosed have a common side. Thus the conductors 52 and 52A of FIG. 1, or 125 and 125A of FIG. 5, or 158 and 158A of FIG. 6, or 188 and 188A of FIG. 7 may constitute a single conducting path. Isolation of the two channels, except in the intentional cross-couplings according to the invention, is however desirable for purposes of accuracy in the voltages generated. More generally, the invention comprehends all modifications on and departures from the embodiments hereinabove described which properly fall within the spirit and scope of the appended claims.

I claim:

1. A sine-cosine computer network for computing and supplying signal values proportional to the sine and to the cosine of the sums of angles $x$ and $\theta$, comprising:
   (a) a sine channel having:
      (1) a first input of sine $x$ to a first pair of terminals;
      (2) a first output from a second pair of terminals;
   (b) a cosine channel having:
      (1) a second input of cosine $x$ to a third pair of terminals;
      (2) a second output from a fourth pair of terminals;
   (c) a first means for coupling the difference of said first input and said first output with the sum of said second input and said second output in accordance with a ratio relationship having the value of tan $(\theta/2)$;
   (d) a second means for coupling the difference of said second input and said second output with the sum of said first input and said first output, in accordance with a ratio relationship having the value of —tan $(\theta/2)$;
   (e) whereby the signal resulting at said first output has a value having a constant proportionality to the sine of the sums of angles $x+\theta$; and
   (f) the signal resulting at said second output has a value having a constant proportionality to the cosine of the sums of angles $x$ and $\theta$.

2. A sine-cosine computer network for computing and supplying signal values proportional to the sine and the cosine of the differences of angles $x$ and $\theta$, comprising:
   (a) a sine channel having:
      (1) a first input of sine $x$ to a first pair of terminals;
      (2) a first output from a second pair of terminals;
   (b) a cosine channel having:
      (1) a second input of cosine $x$ to a third pair of terminals;
      (2) a second output from a fourth pair of terminals;
   (c) a first means for coupling the difference of said first input and said first output with the sum of said second input and said second output, in accordance with a ratio relationship having the value of the reciprocal of tan $(\theta/2)$;
   (d) a second means for coupling the difference of said second input and said second output with the sum of said first input and said first output, in accordance with a ratio relationship having the value of the reciprocal of tan $(\theta/2)$;
(e) whereby the signal resulting at said first output has a value having a constant proportionality to the sine of the differences of angles $x$ and $\theta$; and
(f) the signal resulting at said second output has a value having a constant proportionality to the cosine of the differences of angles $x$ and $\theta$.

3. A sine-cosine computer network according to claim 1, comprising:
(a) a third means for coupling the difference of said first input and said first output with the sum of said second input and said second output, in accordance with a ratio relationship having the value of the reciprocal of tan $(\theta/2)$; and
(b) a fourth means for coupling the difference of said second input and said second output with the sum of said first input and said first output, in accordance with a ratio relationship having the value of the reciprocal of tan $(\theta/2)$;
(c) whereby the signal resulting at said first output has a value having a constant proportionality to the sine of the sums or differences of angles $x$ and $\theta$; and
(d) the signal resulting at said second output has a value having a constant proportionality to the cosine of the sums or differences of angles $x$ and $\theta$.

4. A sine-cosine computer network for computing and supplying signal values proportional to the sine and to the cosine of the sums of angles $x$ and $\theta$ comprising:
(a) a sine channel having:
(1) a first input of sine $x$ to a first pair of terminals;
(2) a first output from a second pair of terminals;
(3) a first transformer having a first winding connecting one of said first pair of terminals to one of said second pair;
(4) a first conductor connecting the other of said first pair of terminals to the other of said second pair;
(5) said first winding of said first transformer having a center tap;
(6) said first transformer having a second winding having one or more taps at points such that the turns ratio of the active portion of said second winding to ½ of said first winding has the value of $-\tan(\theta/2)$;
(b) a cosine channel having:
(1) a second input of cosine x to a third pair of terminals;
(2) a second output from a fourth pair of terminals;
(3) a second transformer having a first winding connecting one of said third pair of terminals to one of said fourth pair;
(4) a second conductor connecting the other of said third pair of terminals to the other of said fourth pair;
(5) said first winding of said second transformer having a center tap;
(6) said second transformer having a second winding having one or more taps at points such that the turns ratio of the active portion of said second winding to ½ of said first winding has the value of tan $(\theta/2)$;
(c) said winding of said first transformer being series connected between said center tap of said first winding of said second transformer and said second conductor;
(d) said second winding of said second transformer being series connected between said center tap of said first winding of said first transformer and said first conductor;
(e) whereby the signal appearing across said first output terminals is sin $(x+\theta)$ and the signal appearing across said second output terminals is cos $(x+\theta)$.

5. A sine-cosine computer network for computing and supplying signal values proportional to the sine and to the cosine of the sums of angles $x$ and $\theta$ comprising:
(a) a sine channel having an input of sin $x$ and an output proportional to sin $(x+\theta)$:
(b) a cosine channel having in input of cos $x$ and an output proportional to cos $(x+\theta)$:
(c) a first circuit interconnecting said channels and supplying signal values in opposition proportional to the electrical analog of sin $(x+\theta)-\sin x$ and tan $(\theta/2)$ [cos $(x+\theta)+\cos x$] respectively;
(d) a second circuit interconnecting said channels and supplying signal values in opposition proportional to the electrical analog of cos $(x+\theta)-\cos x$ and $-\tan(\theta/2)$ [sin $(x+\theta-\sin x$] respectively; and
(e) metns for predetermining said tan $(\theta/2)$ in accordance with the angle $\theta$ desired in said outputs.

6. A sine-cosine computer network according to claim 5 comprising transformer means for each of said circuits for multiplying tan $(\theta/2)$ by [cos $(x+\theta)+\cos x$] and by $-$[sin $(x+\theta)+\sin x$] respectively.

7. A sine-cosine computer network for computing and supplying signal values proportional to the sine and to the cosine of the sums of angles $x$ and $\theta$ comprising:
(a) a sine channel having a first input of sin $x$ and a first output of sin $(x+\theta)$;
(b) a cosine channel having a second input of cos $x$ and a second output of cos $(x+\theta)$;
(c) a first transformer having a coil in circuit with said first input and first output and having a potential input proportional to the arithmetical difference of sin $x$ and sin $(x+\theta)$;
(d) a second transformer having a winding in circuit with said coil of the first transformer and having an input proportional to sin $(x+\theta)+\sin x$;
(e) a third transformer having a coil in circuit with said second input and second output and having a potential input proportional to the arithmetical difference of cos $x$ and cos $(x+\theta)$;
(f) a fourth transformer having a winding in circuit with said coil of the third transformer and having an input proportional to cos $(x+\theta)+\cos x$;
(g) said second and fourth transformers each having means for predetermining the ratio of transformation thereof in accordance with tan $(\theta/2)$;
(h) a first circuit interconnecting said channels and having outputs in opposition from said first and fourth transformers proportional to sin $(x+\theta)-\sin x$ and tan $(\theta/2)$ [cos $(x+\theta)+\cos x$] respectively; and
(i) a second circuit interconnecting said channels and having outputs in opposition from said second and third transformers proportional to cos $(x+\theta)-\cos x$ and $-\tan(\theta/2)$[sin $(x+\theta)+\sin x$] respectively.

8. A sine-cosine computer network for receiving input signals having amplitudes respectively proportional to the sine and cosine functions of an angle and producing respective output signals having amplitudes proportional to the sine and cosine functions of the algebraic sum of said angle and another angle, comprising:
(a) first and second channels for receiving said input signals, respectively, and producing respective output signals;
(b) means in each channel for producing respective cross-coupling signals proportional to the sum of the input and output signals of the respective channel;
(c) and means for inserting predetermined like proportions of the cross-coupling signal of each channel into the other channel to algebraically add to the input signal of said other channel and produce a corresponding output signal;
(d) the signs of the algebraic addition in each channel being predetermined to yield respective output signals proportional to the sine and cosine functions of the algebraic sum of the input signal angle and an angle corresponding to said predetermined like proportions.

9. A sine-cosine computer network according to claim 8 in which the signs of said algebraic addition are opposite in the two channels.

10. A sine-cosine computer network according to claim 9 in which said like proportions of the cross-coupling signal inserted into each channel are predetermined to equal tan ($\theta/2$) times the sum of the input and output signals of the other channel, where $\theta$ is the angle summed with the input signal angle.

11. A sine-cosine computer network according to claim 9 in which said like proportions of the cross-coupling signal inserted into each channel are predetermined to equal the reciprocal of tan ($\theta/2$) times the sum of the input and output signals of the other channel, where $\theta$ is the angle summed with the input signal angle.

12. A sine-cosine computer network for receiving A-C input signals having amplitudes respectively proportional to the sine and cosine functions of an angle and producing respective A-C output signals having amplitudes proportional to the sine and cosine functions of the algebraic sum of said angle and another angle, comprising:
  (a) first and second channels for receiving said input signals, respectively, and producing respective output signals;
  (b) a pair of transformers each having input and output coils;
  (c) said output coils being connected in series between the input and output of respective channels;
  (d) means in each channel for producing respective cross-coupling signals proportional to the sum of the input and output signals of the respective channels;
  (e) means for supplying to the input coil of respective transformers the cross-coupling signal produced in the other channel to induce corresponding cross-coupling signals in respective output coils;
  (f) said induced cross-coupling signals being like proproportions of the cross-coupling signals produced in said channels and of opposite sign in the two channels.

13. A sine-cosine computer network according to claim 12 including means for changing said like proportions of the cross-coupling signals induced in said output coils.

14. A sine-cosine computer network according to claim 12 in which said output coils have center taps, said means in each channel for producing respective cross-coupling signals including respective variable ratio transformers connected across respective channels from respective center taps of the output coils, the supplying of the cross-coupling signals to said input coils of the first-mentioned transformers being from said variable ratio transformers.

15. A sine-cosine computer network for receiving A-C input signals having amplitudes respectively proportional to the sine and cosine functions of an angle and producing respective A-C output signals having amplitudes proportional to the sine and cosine functions of the algebraic sum of said angle and another angle, comprising:
  (a) first and second channels for receiving said input signals, respectively, and producing respective output signals;
  (b) a pair of transformers having separate first and second coils with center taps on said first coils;
  (c) said first coils being connected in series between the input and output of respective channels,
  (d) and cross-coupling means between said channels including respective circuits connected across respective channels from the center tap of said first coil of the transformer therein through a like portion of said second coil of the transformer in the other channel.
  (e) whereby a like proportion of the sum of the input and output signals of each channel is inserted in the other channel to algebraically add to the input signal therein,
  (f) said cross-coupling means being predetermined to produce opposite signs of algebraic addition in the two channels.

16. A sine-cosine computer according to claim 15 including means for changing the like portions of said second coils in the cross-coupling circuits to thereby change the angle summed with the input signal angle.

References Cited
UNITED STATES PATENTS

| | | | |
|---|---|---|---|
| 2,849,668 | 8/1958 | Tripp | 318—28 |
| 2,965,299 | 12/1960 | Gordon | 235—186 |
| 3,025,442 | 3/1962 | Wolff | 318—24 |
| 3,042,307 | 7/1962 | Booth et al. | 235—186 |
| 3,250,904 | 5/1966 | Vasu et al. | 235—186 |
| 3,419,774 | 12/1968 | Hartley | 318—18 |

MALCOLM A. MORRISON, Primary Examiner

J. F. RUGGIERO, Assistant Examiner

U.S. Cl. X.R.

235—189

PO-1050
(5/69)

UNITED STATES PATENT OFFICE
CERTIFICATE OF CORRECTION

Patent No. 3,543,011   Dated  November 24, 1970

Inventor(s)  R. W. Tripp

It is certified that error appears in the above-identified patent and that said Letters Patent are hereby corrected as shown below:

Col. 2, ln. 36, Equation (2), after "sin" insert -- θ -- .

Col. 3, lns. 16 and 45, after "tan (θ)/2" insert -- { -- , and at the end of the line insert -- } -- .

, ln. 67, insert a minus (-) sign between "sin (x + θ)" and "sin x".

Col. 7, ln. 31, for "2" read -- 12 -- .

Col. 8, ln. 48, after "(θ/2" insert -- ) -- .

Col. 9, ln. 43, "propotrional" should read -- proportional --

Col. 13, ln. 13, for "lower" read -- low -- .

Col. 16, ln. 15, the expression between the brackets should re
            -- sin (x + θ) + sin x  -- .

Signed and sealed this 29th day of June 1971.

(SEAL)
Attest:

EDWARD M. FLETCHER, JR.          WILLIAM E. SCHUYLER, JR
Attesting Officer                Commissioner of Patents